May 8, 1928.
N. T. KELSO
1,669,134
MOLDED COMMUTATOR
Filed Dec. 3, 1927
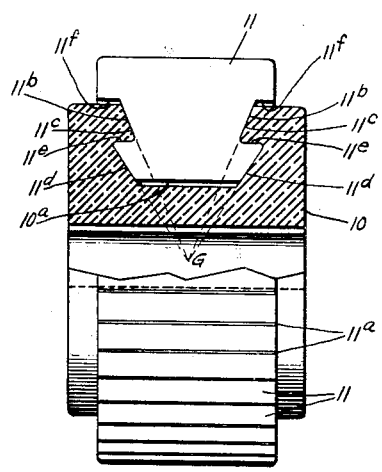
Inventor:
Newton T. Kelso,
by *Alexander S. Lunt*
His Attorney.

Patented May 8, 1928.

1,669,134

UNITED STATES PATENT OFFICE.

NEWTON T. KELSO, OF FORT WAYNE, INDIANA, ASSIGNOR TO GENERAL ELECTRIC COMPANY, A CORPORATION OF NEW YORK.

MOLDED COMMUTATOR.

Application filed December 3, 1927. Serial No. 237,573.

My invention relates generally to molded commutators and more particularly to an improved construction of the bars which are embedded in the bodies of these commutators during the process of molding the same.

It has been the practice heretofore in making such molded commutators to form the bars with sides which taper toward the axis of the commutator and notch the ends of the bars. These bars were arranged in the form of an annulus with suitable insulation, such as mica, between them and were rigidly supported in this form during the process of making the commutator by a ring closely fitting the outer surfaces of the bars. The body of the commutator was then molded with the annulus of bars embedded therein by placing the supporting ring with the bars in a mold with molding material at each end of the annulus of bars. The molding material, such as a fibrous substance having a phenol condensation product binder, was then subjected to heat and pressure which caused the molding material to be forced into the annular opening within the annulus of bars so that the material on each end of the annulus of bars united to form an integral molded body, an opening being formed through the body by a suitable core so that the commutator could be applied to the shaft of the armature on which it was used. The molded body of the commutator ordinarily has a much greater temperature coefficient of expansion than the copper bars embedded therein so that when the commutator is removed from the mold and cools the molded material shrinks away from the inner periphery of the annulus of bars and also away from the inwardly presented surfaces of the notches formed in the ends of the bars. As a result when the supporting ring is removed from the completed commutator one or more of the bars is often forced toward the axis of the commutator into the shrinkage spaces formed during the molding process, resulting in what are known as "low bars". These "low bars" often occur in the manufacturing process because there are no surfaces of the molded body in contact with the bars which effectively resist their being displaced. This makes the surface of the commutator uneven so that it must be discarded, and in the process of manufacture of these commutators it has in many instances been necessary to discard as many as half of the commutators manufactured because of these "low bars".

The object of my invention is to form the bars of these molded commutators in such a manner that the supporting surfaces of the molded body of the commutator will remain in contact with the bars and prevent their moving toward the axis of the commutator after shrinkage of the molded body during the process of making the commutator. I accomplish this by providing the ends of the bars with surfaces which converge substantially towards the geometrical center of the molded body of the commutator and embedding the bars in the body of the commutator so that these surfaces remain in contact therewith upon contraction of the body after the molding operation. These surfaces remain in contact with the body of the commutator for the reason that construction and expansion of the body takes place substantially along lines extending radially from the geometrical center of the body. It will thus be seen that instead of the molded body of the commutator shrinking away from the bars and leaving them unsupported that the molded body will slip along the surfaces which converge towards its geometrical center without separating from the bars, the portion of molded body extending into the notches formed in the bars retaining them firmly against the surfaces. By constructing bars for molded commutators in this manner I have practically eliminated the occurrence of "low bars" during the process of making the commutators.

My invention will be more fully set forth in the following description referring to the accompanying drawing, and the features of novelty which characterize my invention will be pointed out with particularity in the claims annexed to and forming a part of this specification.

In the drawing the single figure shows a molded commutator embodying my invention.

Referring to the drawing, the molded commutator, which I have shown as illustrative of one embodiment of my invention, comprises a molded body 10 having an annulus of copper bars 11 embedded therein. These bars are usually insulated from each other by mica or the like 11ª and the portion of the ends of the bars embedded in the body are notched at 11ᵇ forming annular grooves to which the molded body conforms so as to support the bars therein. During the process of molding the body the bars with the insulation between them are rigidly supported in this arrangement by a ring engaging the outer surfaces of the bars. The ring and the bars are placed in a mold with a molding material such as a fibrous substance having a binder of a phenol condensation product and the material is subjected to heat and pressure in the usual manner to solidify the material and form the body 10. After the commutator is removed from the mold and cooled the body shrinks more than the bars as the molded body has a greater temperature coefficient of contraction than the copper bars. In order to prevent the body 10 from shrinking away from the bars 11 so as to leave them unsupported, surfaces are formed thereon engaging the molded body which converge substantially toward the geometrical center of the body. It is well known that contraction of a body during a drop in temperature takes place substantially toward its geometrical center so that the portion of the body in contact with these surfaces merely slips relative thereto without separating therefrom, the portion of the body extending into the notches formed in the bars or engaging suitable projections carried thereby retaining them in contact with the converging surfaces. In the commutator shown in the drawing such converging surfaces are formed at 11ᶜ in the notches 11ᵇ formed in the ends of the bars and also at 11ᵈ on the portion of the ends of the bars embedded in the body 10, all of these surfaces converging substantially toward the geometrical center G of the body 10. In order that the portion of the bars extending into the annular groove formed by the notches 11ᵇ shall securely retain the bars 11 against the surfaces 11ᶜ and 11ᵈ, outwardly presented surfaces 11ᵉ are formed in the notches extending at an angle to the converging surfaces 11ᶜ and 11ᵈ. After the commutator is removed from the mold the body 10 cools and shrinks away from the inner surfaces of the bars at 10ª and the surfaces 11ᶠ in the notches, however, the portion of the body extending into the notches 11ᵇ bears against the surfaces 11ᶜ and retains the surfaces 11ᶜ and 11ᵈ against the body which slide over the same without separating therefrom so that the bars are firmly supported in the body even though it has shrunk away from the bars at 10ª and 11ᶠ.

It will be understood that the surfaces 11ᶜ and 11ᵈ should converge toward the geometrical center G of the body if there were no contraction of the bars 11 but the convergence of these surfaces may be made slightly greater or less than toward the geometrical center to compensate for the contraction of the bars. In most instances the temperature coefficient of contraction of the molded body is so much greater than that of the bars that if these surfaces converge substantially toward the geometrical center of the body the bars will be rigidly supported in the body by the surfaces of the bars in contact therewith after contraction of the body.

Although I have shown my invention applied to a molded commutator in a particular manner, I desire it to be understood that my invention is not limited to the arrangement shown and described except as defined in the appended claims.

What I claim as new and desire to secure by Letters Patent of the United States, is,—

1. A commutator comprising a molded body, and a plurality of bars embedded in said body, said bars having notches therein formed with surfaces in contact with said body which converge substantially toward the geometrical center of said body so that the converging surfaces in said notches remain in contact with said molded body upon contraction of said body.

2. A commutator comprising a molded body, bars embedded in said body, the ends of said bars being formed with surfaces in contact with said body which converge substantially toward the geometrical center of said body so that the converging surfaces of said bars remain in contact with said body upon contraction of said body.

3. A commutator comprising a molded body, bars embedded in said body, the ends of said bars having a projection for retaining them in said body and being formed with surfaces in contact with said body which converge substantially toward the geometrical center of said body so that the converging surfaces of said bars remain in contact with said body upon contraction of said body.

4. A commutator comprising a molded body and a plurality of bars, said bars being notched at each end thereof and embedded in said molded body so that said notches retain said bars in place, the notches in said bars and the ends thereof being formed with surfaces converging substantially toward the geometrical center of said molded body so that the converging surfaces of said bars remain in contact with said body upon contraction of said body.

5. A commutator comprising a molded body and a plurality of bars insulated from each other and arranged in the form of an annulus, said bars being notched at each end thereof so as to form annular grooves at the ends thereof and embedded in said molded body so that the latter extends into said grooves for retaining said bars in place, each of the notches and each of the ends of said bars being formed with surfaces converging substantially toward the geometrical center of said molded body so that the converging surfaces of said bars remain in contact with said body upon contraction of said body.

In witness whereof, I have hereunto set my hand this 1st day of December, 1927.

NEWTON T. KELSO.

CERTIFICATE OF CORRECTION.

Patent No. 1,669,134.      Granted May 8, 1928, to

NEWTON T. KELSO

It is hereby certified that error appears in the printed specification of the above numbered patent requiring correction as follows: Page 1, line 77, for the word "construction" read "contraction"; and that the said Letters Patent should be read with this correction therein that the same may conform to the record of the case in the Patent Office.

Signed and sealed this 5th day of June, A. D. 1928.

(Seal)      M. J. Moore,
Acting Commissioner of Patents.